United States Patent
Shimazu et al.

[11] Patent Number: 5,953,176
[45] Date of Patent: Sep. 14, 1999

[54] CONTROL METHOD FOR A HIGH-DENSITY TYPE FDD CAPABLE OF AUTOMATICALLY ROTATING A FD INSERTED THEREIN AT A ROTATION SPEED MATCHED WITH THE FD

[75] Inventors: Teruo Shimazu, Atsugi; Toshiharu Shimizu, Machida; Yoshihide Majima, Hatano; Toshimitsu Itoh, Atsugi, all of Japan

[73] Assignee: Mitsumi Electric Co., Ltd., Tokyo, Japan

[21] Appl. No.: 08/859,676

[22] Filed: May 20, 1997

[30] Foreign Application Priority Data

May 27, 1996 [JP] Japan .................................. 8-132163
Jun. 7, 1996 [JP] Japan .................................. 8-145618

[51] Int. Cl.$^6$ .................................................. G11B 15/46
[52] U.S. Cl. ................................. 360/73.03; 360/69
[58] Field of Search ................. 369/73.03, 69, 369/73.02, 73.08, 73.01; 360/99.03, 99.04, 99.01

[56] References Cited

U.S. PATENT DOCUMENTS 4,656,533  4/1987  Sakai et al. ........................ 360/73.03
5,434,722  7/1995  Bizjak et al. ....................... 360/73.03

*Primary Examiner*—Thang V. Tran
*Attorney, Agent, or Firm*—Frishauf, Holtz, Goodman, Langer & Chick, P.C.

[57] ABSTRACT

In a high-density FDD for driving a magnetic disk medium of an FD inserted thereinto, a switch unit 50 detects whether the inserted FD is a large-capacity FD or a small-capacity FD. A control device 60 is connected to the switch unit 50, a control device 60 controls drive of a spindle motor 100 so as to rotate the spindle motor 100 at a high rotation speed when the inserted FD is identified as a large-capacity FD, and so as to rotate the spindle motor 100 at a low rotation speed when the inserted FD is identified as a small-capacity FD.

7 Claims, 6 Drawing Sheets

CONTROL METHOD FOR A HIGH-DENSITY TYPE FDD CAPABLE OF AUTOMATICALLY ROTATING A FD INSERTED THEREIN AT A ROTATION SPEED MATCHED WITH THE FD

BACKGROUND OF THE INVENTION

This invention relates to a high-density type flexible disk drive and, in particular, to a method of controlling a spindle motor for use in the high-density type flexible disk drive.

As is well known in the art, a flexible or floppy disk drive (which may be abbreviated to "FDD") is a device for carrying out data recording and reproducing operation to and from a magnetic disk medium of a flexible or floppy disk (which may be abbreviated to "FD") inserted therein. In recent years, the FDs have been improved to have a greater capacity. Specifically, development has been made of FDs having the storage capacity of 128 Mbytes (which may be called large-capacity FDs) in contrast with FDs having storage capacity of 1 Mbyte or 2 Mbytes (which may be called small-capacity FDs). Following such development, the FDDs have also been improved to accept the large-capacity FDs for data recording and reproducing operations to and from the magnetic disk media of the large-capacity FDs.

Throughout the present specification, FDDs capable of recording/reproducing data for magnetic disk media of the large-capacity FDs alone will be referred to high-density exclusive type FDDs. On the other hand, FDDs capable of recording/reproducing data for magnetic disk media of the small-capacity FDs alone will be called low-density exclusive type FDDs. Furthermore, FDDs capable of recording/reproducing data for magnetic disk media of both the large-capacity and the small-capacity FDs will be called high-density/low-density compatible type FDDs. In addition, the high-density exclusive type FDDs and the high-density/low-density compatible type FDDs will collectively be called high-density type FDDs.

The low-density exclusive type FDD and the high-density type FDD are different in mechanism from each other in several respects, one of which will presently be described. In either FDD, a magnetic head is supported by a carriage which is driven by a drive arrangement to move in a predetermined radial direction with respect to the magnetic disk medium of the FD inserted in the FDD. The difference resides in the structure of the drive arrangement. More specifically, the low-density exclusive type FDD uses a stepping motor as the drive arrangement. On the other hand, the high-density type FDD uses a linear motor such as a voice coil motor (which may be abbreviated to "VCM") as the drive arrangement.

Now, description will be made with respect to the voice coil motor used as the drive arrangement in the high-density type FDD. The voice coil motor comprises a voice coil and a magnetic circuit. The voice coil is disposed on the carriage at a rear side and is wound around a drive axis extending in parallel to the predetermined radial direction. The magnetic circuit generates a magnetic field in a direction intersecting that of an electric current flowing through the voice coil. With this structure, by causing the electric current to flow through the voice coil in a direction intersecting that of the magnetic field generated by the magnetic circuit, a drive force occurs in a direction extending to the drive axis on the basis of interaction of the electric current with the magnetic field. The drive force causes the voice coil motor to move the carriage in the predetermined radial direction.

Another difference between the low-density exclusive type FDD and the high-density type FDD resides in the revolution speed of a spindle motor for rotating the magnetic disk medium of the FD inserted therein. More specifically, the low-density exclusive type FDD can admit the small-capacity FD alone as the FD to be inserted thereinto. As a result, the spindle motor for the low-density exclusive type FDD may rotate the magnetic disk medium of the small-capacity FD inserted therein at a low rotation speed having a revolution speed of either 300 rpm or 360 rpm. On the other hand, the high-density type FDD can admit, as the FD to be inserted thereinto, either the large-capacity FD alone or both of the large-capacity FD and the small-capacity FD. As a result, when the large-capacity FD is inserted in the high-density type FDD, the spindle motor for the high-density type FDD must rotate the magnetic disk medium of the large-capacity FD inserted therein at a high rotation speed of 3600 rpm which is equal to ten or twelve times as large as that of the small-capacity FD.

As a result, it is necessary for the high-density/low-density compatible type FDD to identify and detect whether the FD inserted therein is the large-capacity FD or the small-capacity FD.

In addition, the small-capacity FD and the large-capacity FD are different in structure from each other in several other respects, one of which will presently be described. Both of the large-capacity and the small-capacity FDs have a flat rectangular shape of a width of 90 mm, a length of 94 mm, and a thickness of 3.3 mm in case of a 3.5-inch type. In either FD, a magnetic disk medium of disk-shaped is covered with a case which is called a shell. The case consists of an upper case and a lower case with the magnetic disk medium sandwiched there-between. The lower case of the small-capacity FD is provided with a thin sheet-shaped board having a spring force for applying load to the magnetic disk medium in order to positively carry out chucking of the magnetic disk medium. Such a thin sheet-shaped board is called a lifter. On the other hand, the large-capacity FD is not provided with such a lifter. This is because it is unfavorable for the large-capacity FD to apply the load to the magnetic disk medium because the high-density type FDD must make the magnetic disk medium rotate at the high rotation speed of 3600 rpm as described above.

In the prior art, in a case where the high-density type FDD carries out data recording and reproducing operation to and from the magnetic disk medium of the large-capacity FD inserted therein, the magnetic disk medium of the large-capacity FD is immediately rotated by the spindle motor at the high rotation speed on rotation starting.

In order to rotate the magnetic disk medium of the large-capacity FD by the spindle motor, it is necessary to positively chuck a disk hub of the large-capacity FD on rotation starting of the magnetic disk medium thereof.

More specifically, the disk hub is a disk-shaped metal which is freely received in a circular aperture formed in the lower case of the large-capacity FD at a center portion thereof. The disk hub has a disk center hole at a center portion and a chucking hole (a disk driving oval hole) at a position eccentric with the center portion. The disk hub holds the magnetic disk medium sandwiched between the upper case and the lower case. Accordingly, to rotate the magnetic disk medium may rotate the disk hub by the spindle motor. On the other hand, the spindle motor includes a rotor which comprises a disk holder table, a spindle shaft, and a chucking pin (a drive roller). The disk holder table is for holding the disk hub and is mechanically in contact with the disk hub on rotating of the magnetic disk medium. The spindle shaft is integrally coupled with the disk holder table with the spindle shaft perpendicularly raised from the disk holder table and is freely received in the disk center hole of the disk hub. The chucking pin is upwardly protruded from the disk holder table to move up and down and should be freely received in the chucking hole. That is, to positively chuck the disk hub with respect to the disk holder table, the chucking pin engages with a corner portion of the chucking hole in the disk hub in a radial direction outwardly with the chucking pin freely received in the chucking hole.

While the spindle motor rotates at the high rotation speed immediately on rotation starting in the manner of a conventional starting method for the spindle motor, the disk holder table also rotates at the high rotation speed. In this event, the chucking pin is put into a state buried in the disk holder table without the chucking pin received in the chucking hole. In the very worst case, although the chucking pin is instantaneously received in the chucking hole, there is a possibility of breaking of the chucking pin due to the impact of the chucking pin on the disk hub because the disk holder table rotates at the high rotation speed.

SUMMARY OF THE INVENTION

It is therefore an object of this invention to provide a control method and a control system for a spindle motor for use in a high-density/low-density compatible type FDD, which is capable of automatically rotating a magnetic disk medium of a FD inserted therein at a rotation speed matched with the FD.

It is another object of this invention to provide a rotation starting method of a spindle motor and a disk chucking method for a high-density type FDD, which is capable of positively chucking a disk hub of a large-capacity FD on rotation starting of a magnetic disk medium of a large-capacity FD.

A first method of the invention is applicable for controlling a spindle motor for use in a high-density/low-density compatible type flexible disk drive for enabling data recording and reproducing operation to and from magnetic disk media of both a large-capacity and a small-capacity flexible disks. The magnetic disk medium of the large-capacity flexible disk is required to be rotated at a high rotation speed on recording and reproducing. The magnetic disk medium of the small-capacity flexible disk is required to be rotated at a low rotation speed which is substantially lower than the high rotation speed on recording and reproducing. According to a first aspect of this invention, the method comprises the steps of detecting whether a flexible disk inserted in the high-density/low-density compatible type flexible disk drive is the large-capacity flexible disk or the small-capacity flexible disk, and of driving the spindle motor so as to rotate the spindle motor at the high rotation speed when the inserted flexible disk is identified as the large-capacity flexible disk and so as to rotate the spindle motor at the low rotation speed when the inserted flexible disk is identified as the small-capacity flexible disk.

The control system of the invention is applicable for use in a high-density/low-density compatible type flexible disk drive for enabling to data recording and reproducing to and from magnetic disk media of both a large-capacity and a small-capacity flexible disks. The magnetic disk medium of the large-capacity flexible disk is required to be rotated at a high rotation speed on recording and reproducing. The magnetic disk medium of the small-capacity flexible disk is required to be rotated at a low rotation speed which is substantially lower than the high rotation speed on recording and reproducing. According to a second aspect of this invention, the control system comprises a detecting arrangement for detecting whether a flexible disk inserted in the high-density/low-density compatible type flexible disk drive is the large-capacity flexible disk or the small-capacity flexible disk. Connected to the detecting arrangement, a control device controls drive of the spindle motor so as to rotate the spindle motor at the high rotation speed when the inserted flexible disk is identified as the large-capacity flexible disk and so as to rotate the spindle motor at the low rotation speed when the inserted flexible disk is identified as the small-capacity flexible disk.

Another method of the invention is applicable for starting rotation of a magnetic disk medium of a large-capacity flexible disk by a spindle motor for use in a high-density type flexible disk drive for carrying out data recording and reproducing to and from the magnetic disk medium of the large-capacity flexible disk which is required to be rotated at a high rotation speed on recording and reproducing. The large-capacity flexible disk has a disk hub for holding the magnetic disk medium. According to a third aspect of this invention, the method comprises a first step of rotating the spindle motor at a low rotation speed which is substantially lower than the high rotation speed on rotation starting of the magnetic disk medium, and a second step of rotating the spindle motor at the high rotation speed after chucking is achieved with respect to the disk hub of the large-capacity flexible disk.

Still further, a disk chucking method of the invention is applicable for use in a high-density type flexible disk drive for carrying out data recording and reproducing to and from a magnetic disk medium of a large-capacity flexible disk which is required to be rotated at a high rotation speed on recording and reproducing. The large-capacity flexible disk has a structure so as to reduce a load with respect to the magnetic disk medium on rotating thereof. The large-capacity flexible disk comprises a disk hub for holding the magnetic disk medium. The disk hub has a chucking hole with a corner portion in the disk hub in a radial direction outwardly. The high-density type flexible disk drive includes a spindle motor for rotating the disk hub. The spindle motor comprises a disk holder table for holding the disk hub and a chucking pin which should be freely received in the chucking hole. The disk holder table has a table driving oval hole with an inclined portion. According to a fourth aspect of this invention, the method comprises the steps of rotating the spindle motor at a low rotation speed which is substantially lower than the high rotation speed on rotation starting of the magnetic disk medium, and increasing a rotation speed of the spindle motor up to the high rotation speed from the low rotation speed by a predetermined abrupt acceleration after chucking is achieved with respect to the disk hub of the large-capacity flexible disk. Thereby, the chucking pin is made by the predetermined abrupt acceleration move in the table driving oval hole of the disk holder table along the inclined portion thereof in the radial direction outwardly so as to make the chucking pin engage with the corner portion of the chucking hole. As a result, the chucking is positively carried out between the disk hub and the disk holder table.

DESCRIPTION OF THE PREFERRED EMBODIMENTS

Figure 1:
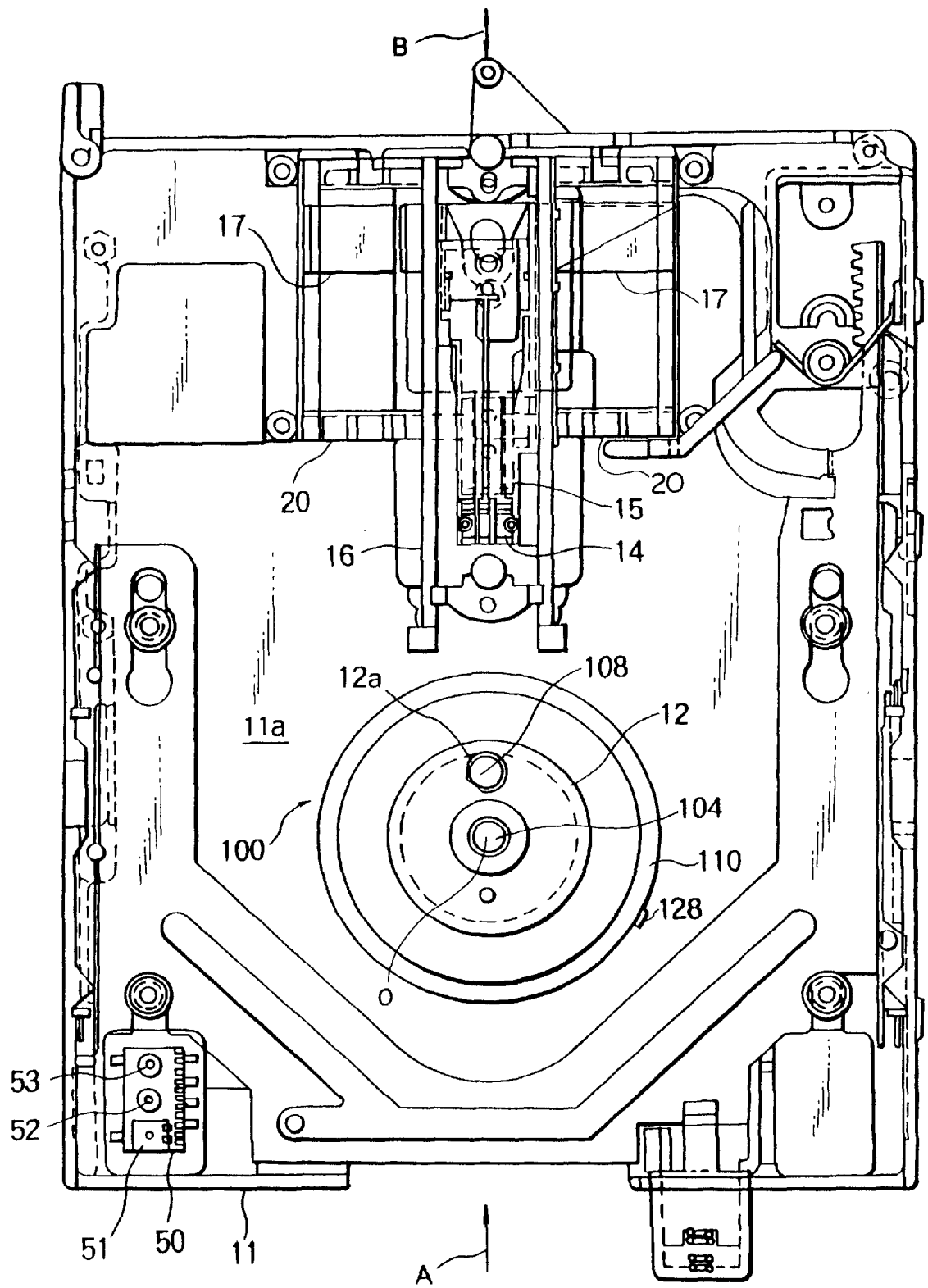
FIG. 1 is a plan view of a high-density type flexible disk drive to which this invention is applicable.

Referring to FIG. 1, description will proceed to a high-density type FDD to which this invention is applicable. The illustrated high-density type FDD is a high-density/low-density compatible type FDD for enabling to carry out recording/reproducing of data for magnetic disk media of both a large-capacity and a small-capacity FDs which will later be described. The FD is inserted into the high-density type FDD from an insertion direction indicated by an arrow A in FIG. 1. FIG. 1 shows a state where the FD is inserted into the high-density type FDD. The FD has a disk center axis (not shown).

The high-density type FDD comprises a main frame 11 having a main surface 11a and a disk holder table 12 which is rotatably supported on the main surface 11a of the main frame 11. The disk holder table 12 has a table center axis O which acts as the axis of the rotation. The inserted FD is held on the holder disk table 12 so that the table center axis O coincides with the disk center axis. The disk holder table 12 is rotatably driven by a spindle motor 100 which will later be described. The spindle motor 100 is mounted on the main frame 11 with the spindle motor 100 put into a state embedded in a concave portion (which will later be described) of the main frame 11, thereby the magnetic disk medium in the FD rotates at a desired rotation speed in the manner which will become clear. In addition, the main frame 11 has a back surface (not shown) on which a printed-circuit board (not shown) is attached. A number of electronic parts (not shown) are mounted on the printed-circuit board.

The high-density type FDD comprises a pair of magnetic heads (not shown) for reading/writing data from/to the magnetic disk medium in the FD. The magnetic heads are supported via gimbals 14 with the carriage 15. A combination of the magnetic heads, the gimbals 14, the carriage 15, a pair of voice coils 17 (which will later be described), a scale (not shown), a spring holder, and a spring is called a carriage assembly. The carriage 15 is disposed over the main surface 11a of the main frame 11 with a space left therebetween. The carriage 15 supports the magnetic heads movably in a predetermined radial direction (i.e. a direction indicated by an arrow B in FIG. 1) with respect to the FD.

The carriage 15 is supported and guided at both lower sides thereof by a pair of guide bars 16 which extend to directions in parallel with the predetermined radial direction B.

The carriage 15 is driven in the predetermined radial direction B by a voice coil motor which will later be described. More specifically, the voice coil motor comprises the pair of voice coils 17 and a pair of magnetic circuits 20. The voice coils 17 are disposed on the carriage 15 at a rear side and are wound around driving axes in parallel with the predetermined radial direction B. The magnetic circuits 20 generate magnetic fields which intersect currents flowing in the voice coils 17. With this structure, by causing the currents to flow in the voice coils 17 in directions where the magnetic fields generated by the magnetic circuits 20 intersect, driving force occurs along the predetermined radial direction B extending to the driving axes on the basis of interaction between the currents and the magnetic fields. The driving force causes the voice coil motor to move the carriage 15 in the predetermined radial direction B.

Figure 2A:
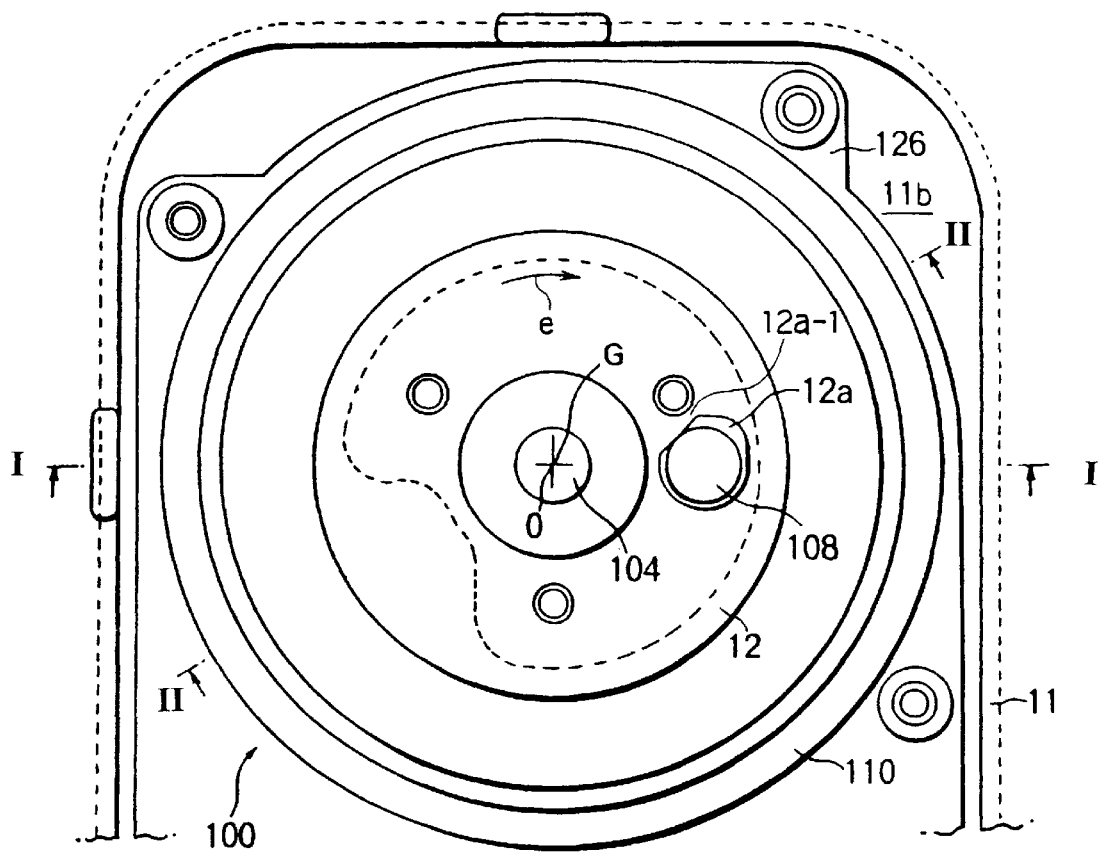
FIGS. 2A and 2B collectively show the spindle motor for use in the high-density type flexible disk drive illustrated in FIG. 1.
Figure 2B:
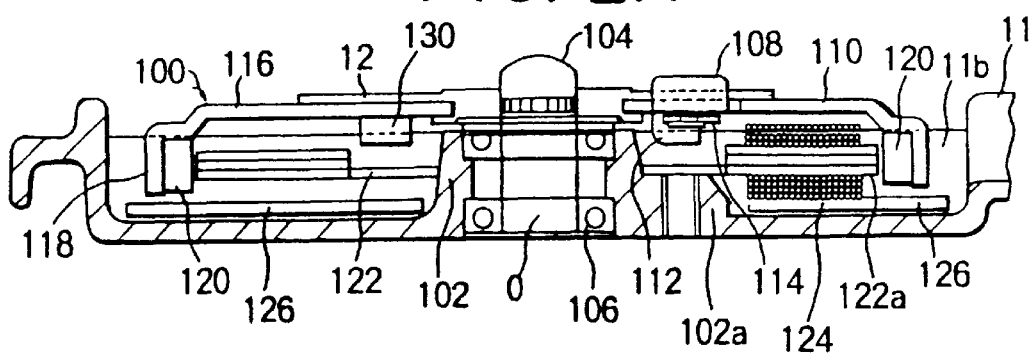

Referring to FIGS. 2A and 2B, description will proceed to the spindle motor 100 for use in the high-density type FDD illustrated in FIG. 1. The spindle motor 100 comprises a rotor and a stator both of which will later become clear. FIG. 2A is a plan view of the spindle motor 100. FIG. 2B is a cross-sectional view taken on line I—I with respect to the rotor and on line II—II with respect to the stator in FIG. 2A.

The illustrated spindle motor 100 is a type mounted on the main surface 11a of the main frame 11 in place of the back surface of the main frame 11. In particular, the spindle motor 100 is mounted on the main surface 11a with the spindle motor 100 embedded in the concave portion 11b of the main frame 11.

The main frame 11 comprises a bearing metal 102 of substantially cylindrical shape in the concave portion 11b. The bearing metal 102 stands in the concave portion 11b substantially perpendicular to the main surface 11a of the main frame 11. With the bearing metal 102, a spindle shaft 104 is rotatably supported with respect to the main frame 11 via a ball bearing 106 substantially perpendicular to the main surface 11a of the main frame 11. The spindle shaft 104 serves as the axis O of the rotation for the magnetic disk medium of the FD inserted in the high-density type FDD. The disk holder table 12 is fixed to the spindle shaft 104 at an upper portion thereof. The disk holder table 12 has a main surface which extends to a direction perpendicular to a longitudinal direction (a direction of the axis O of the rotation) of the spindle shaft 104.

That is, the disk holder table 12 is rotatably supported on the main surface 11a of the main frame 11 and holds the FD inserted in the high-density type FDD so that the table center axis O (the axis of the rotation) coincides with the disk center axis of the FD.

Figure 3:
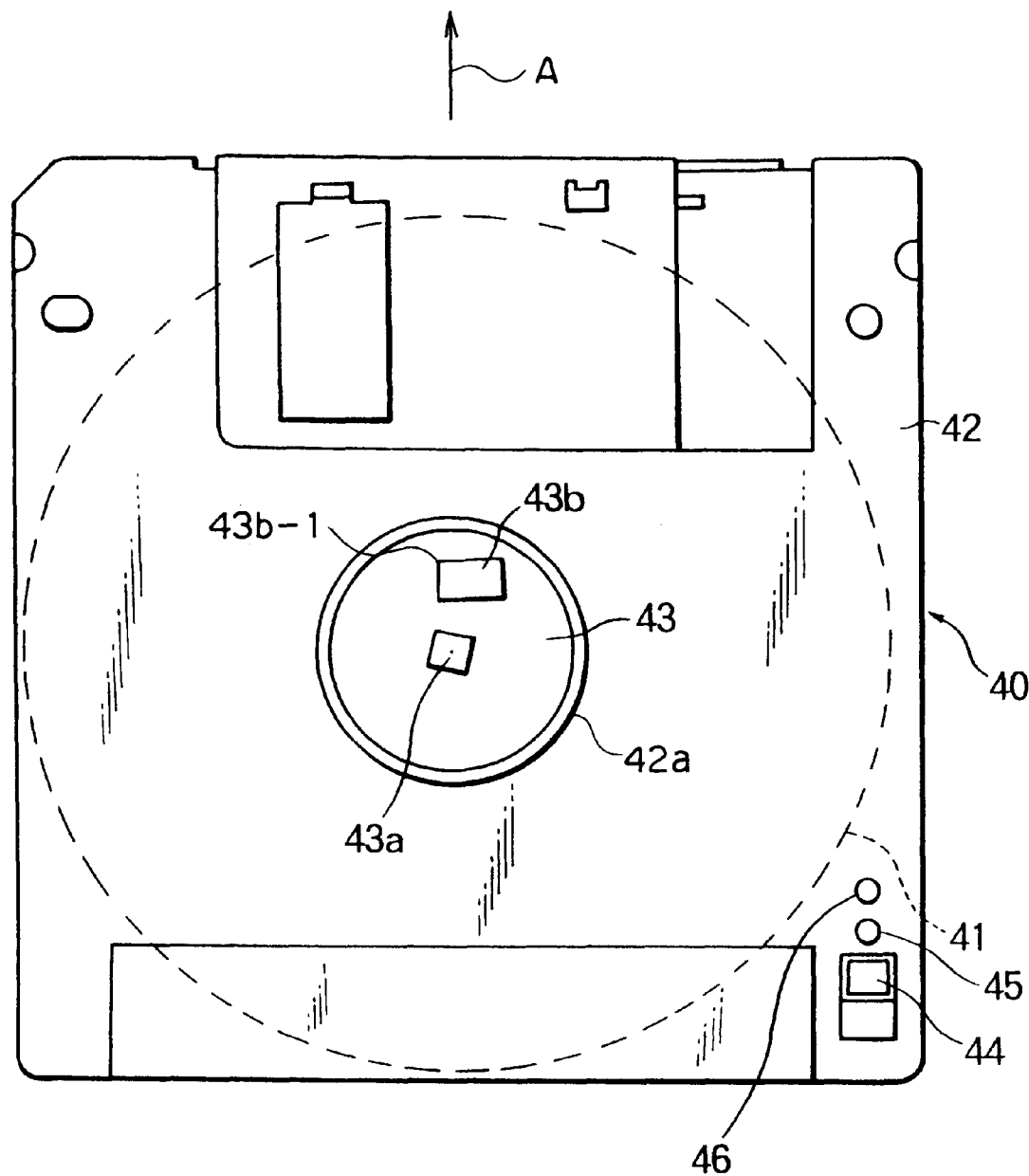
FIG. 3 is a plan view showing a bottom surface of a large capacity flexible disk inserted in the high-density type flexible disk drive illustrated in FIG. 1.

Turning to FIG. 3, description will proceed to the large-capacity FD depicted at 40. FIG. 3 is a plan view showing a bottom surface of the large-capacity FD 40. The illustrated large-capacity FD 40 is a 3.5-inch type and comprises a magnetic disk medium 41 serving as a magnetic recording medium, and a case 42 for covering the magnetic disk medium 41. The case 42 consists of an upper case (not shown) having a main surface and a lower case having the bottom surface. In the bottom surface of the case 42, a circular aperture 42a is formed at a center portion of the large-capacity FD 40. In the circular aperture 42a is freely received a disk hub (a disk-shaped metal) 43 for holding the magnetic disk medium 41. The disk hub 43 has a disk center hole 43a at a center portion thereof and a chucking hole (a disk driving oval hole) 43b at a position eccentric with the center portion thereof. The disk center hole 43a has substantially a rectangular shape and receives the spindle shaft 104 (FIG. 2B) therein in the manner which will later be described. The chucking hole 43b freely receives a chucking pin or a drive roller (which will later be described) therein in the manner which will also later be described.

Turning back to FIGS. 2A and 2B, the disk holder table 12 has a diameter which is longer than that of the disk hub 43 and which is shorter than that of the circular aperture 42a of the case 42.

The disk holder table 12 has a table driving oval hole 12a at a position corresponding to the chucking hole (the disk driving oval hole) 43b (FIG. 3). Through the table driving oval hole 12a, the chucking pin (the drive roller) 108 is freely received in the chucking hole 43b of the FD 40 in the manner which will later become clear. The table driving oval hole 12a has an inclined portion 12a-1 as shown in FIG. 2A. The disk holder table 12 is mounted on a magnetic case 110 at a bottom surface thereof. The magnetic case 110 has a flexible arm 112 having an end which is provided with a holding portion 114. The chucking pin 108 is rotatably and movably mounted on the flexible arm 112 at the end thereof via the holding portion 114 with the chucking pin 108 urged upwardly. Accordingly, the chucking pin 108 moves downwardly or sinks in the disk holder table 12 if any load is applied to the chucking pin 108 downwards.

In the example being illustrate, the magnetic case 110 is made of iron and is formed in a shape of a tray by presswork. More specifically, the magnetic case 110 comprises a disk portion 116 and a circumferential wall 118. The disk portion 116 extends in a direction parallel with the disk holder table 12. The circumferential wall 118 is bent downwardly at an circumferential edge of the disk portion 116. The circumferential wall 118 has an inner surface on which a ring-shaped main magnet 120 is fixed.

At any rate, the spindle shaft 104, the disk holder table 12, the chucking pin 108, the magnetic case 110, the arm 112, the holding portion 114, and the main magnet 118 compose the rotor of the spindle motor 100.

The bearing metal 102 includes a flange portion 102a. On the flange portion 102, a core 122 is fixed by screws (not shown) and is mounted. The core comprises a plurality of magnetic pole forming sections 112a which extend with equal intervals in a radial manner. Around each magnetic pole forming section 112a, a coil 124 is wound. That is, a combination of the magnetic pole forming section 112a and the coil 124 serves as an electromagnet or a magnetic pole. The electromagnet is opposed to the above-mentioned main magnet 120 with a predetermined space (gap) left therebetween. At any rate, the core 122 and the coils 124 compose the stator of the spindle motor 100.

The circumferential wall 118 of the magnetic case 108 has an outer surface at a predetermined position of which an index detection magnet 128 (FIG. 1) of rectangular parallelepiped shape is fixed. In addition, in the concave portion 11b of the main frame 11, a printed-circuit board 126 is fixed by screws (not shown) and is received. Mounted on the printed-circuit board 126, a magnetic sensor (not shown) detects a magnetic field generated by the index detection magnet 128.

Furthermore, the illustrated spindle motor 100 is provided with a balancer 130 acting as a balance arrangement. The balancer 130 is mounted on the magnetic case 110 at the bottom surface thereof opposite to the chucking pin 108 with the spindle shaft 104 sandwiched therebetween. As a result, it is possible to balance the rotor of the spindle motor 100 on rotating (in particular, on rotating at the high rotation speed) so as to make the center G of gravity in the rotor coincide with the axis O of the rotation.

Figure 4:
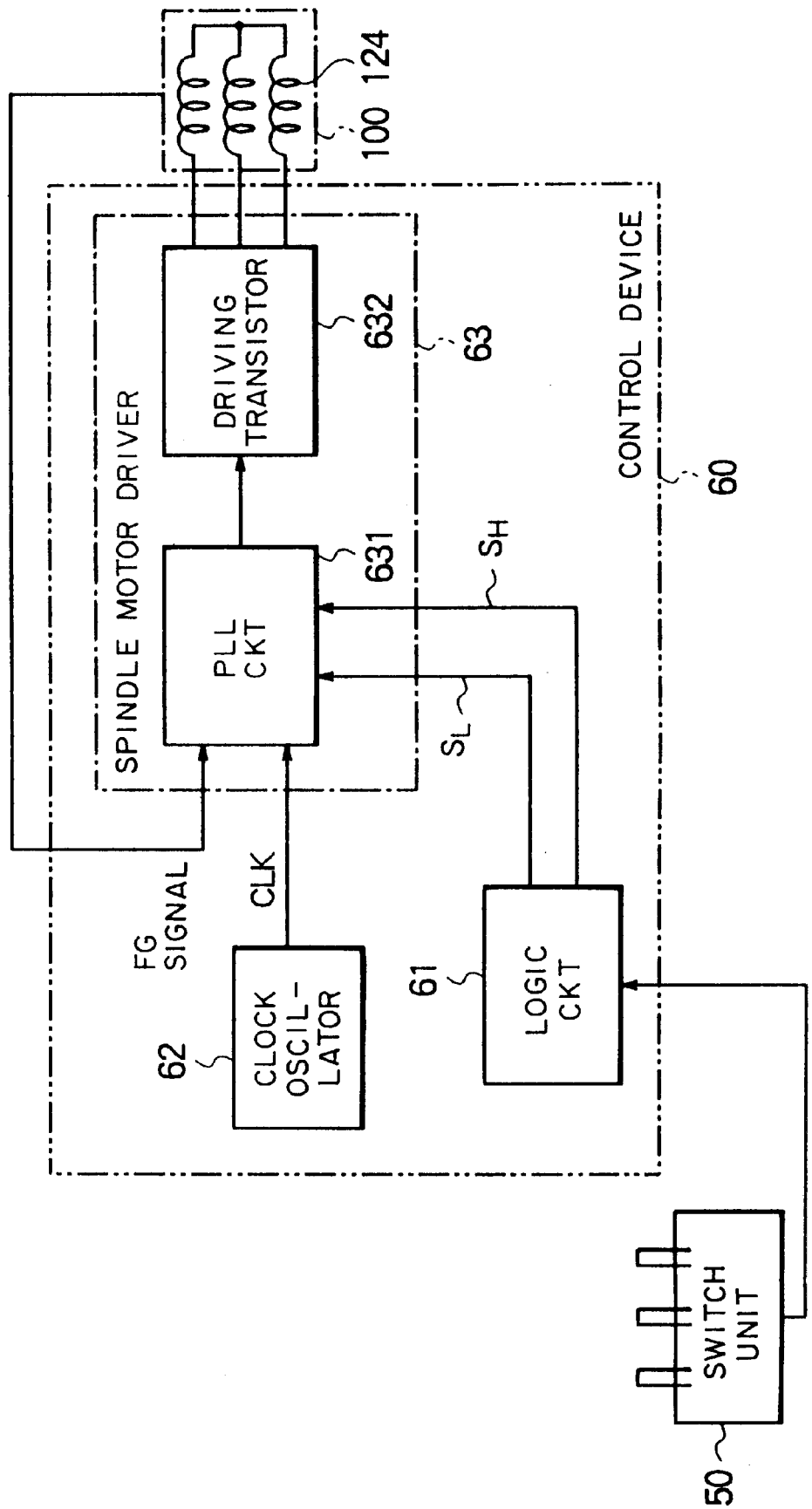
FIG. 4 is a block diagram of a control system according to an embodiment of this invention.

Referring to FIG. 3 again, a write protection hole (not shown) is bored in the case 42 of the large-capacity FD 40 at a corner portion in rear and right-hand side with respect to an insertion direction depicted at an arrow A of FIG. 3 as viewed from the bottom surface of the large-capacity FD 40. In other words, the write protection hole is bored in the case 42 of the large-capacity FD 40 at the corner portion in rear and left-hand side in the insertion direction A as viewed from the main surface of the large-capacity FD 40. FIG. 4 shows a state where the write protection hole is shut by a write protection tab 44. The write protection tab 44 enables to slide in the insertion direction A. It is possible to carry out opening and closing of the write protection hole by operating the write protection tab 44 manually. When the write protection hole is closed by the write protection tab 44, the large-capacity FD 40 is put into a write enable state. When the write protection hole is opened by the write protection tab 44, the large-capacity FD 40 is put into a write disable state.

The illustrated large-capacity FD 40 shows a case where there is two types of storage capacity of, for example, 128 Mbytes and 256 Mbytes. In the neighborhood of the write protection hole, a large-capacity identification hole 45 is bored in the case 42 of the large-capacity FD 40. The large-capacity identification hole 45 is for identifying the large-capacity FD 40 in distinction from the small-capacity FD. In addition, a type identification hole 46 is selectively bored in the case 42 of the large-capacity FD 40 near the write protection hole together with the large-capacity identification hole 45. The type identification hole 46 is for identifying a type of the large-capacity FD 40. It is possible to identify the type of the large-capacity FD 40 according to the presence or absence of the type identification hole 45. It is assumed that the large-capacity FD 40 having the storage capacity of 128 Mbytes is referred to a first type of the large-capacity FD while the large-capacity FD 40 having the storage capacity of 256 Mbytes is referred to a second type of the large-capacity FD. In the example being illustrated, the type identification hole 46 is not bored in the case 42 of the first type of the large-capacity FD while the type identification hole 46 is bored in the case 42 of the second type of the large-capacity FD.

Although illustration is omitted, as is well known in the art, the large-capacity identification hole 45 and the type identification hole 46 are not bored in a case of the small-capacity FD.

Turning back to FIG. 1 in addition to FIG. 3, on the printed-circuit board (not shown) mounted on the back surface of the main frame 11, the high-density type FDD further comprises a switch unit 50 at a corner position in rear and left-hand side with respect to the insertion direction A. The switch unit 50 comprises a plurality of push switches which will presently be described. The switch unit 50 is for detecting the presence or absence of the write protection hole, the large-capacity identification hole 45, and the type identification hole 46.

More specifically, the switch unit 50 comprises a write control switch 51, a large-capacity detection switch 52, and a type detection switch 53. The write control switch 51 is a switch for detecting the opening or closing state of the write protection hole and is disposed at a position corresponding to the write protection hole. The large-capacity detection switch 52 is a switch for detecting whether the inserted FD is the large-capacity FD 40 or the small-capacity FD and is disposed at a position corresponding to the large-capacity identification hole 45. The type detection switch 53 is a switch for detecting the presence or absence of the type identification hole 45 and is disposed at a position corresponding to the type identification hole 46.

Although illustration is omitted, the stator of the spindle motor 100 comprises a frequency generation pattern (which is abbreviated an FG pattern hereinafter) for detecting the rotation speed thereof. The FG pattern generates an FG signal having pulses which are in number to sixty during one rotation of the spindle motor 100. As is well known in the art, 300 rpm is equivalent to 5 Hz/rev while 3600 rpm is equivalent to 60 Hz/rev. As a result, the FG pattern generates the FG signal having a frequency of 300 Hz if the magnetic disk medium of the small-capacity FD rotates at its prescribed rotation speed of 300 rpm by the spindle motor 100.

Likewise, the FG pattern generates the FG signal having a frequency of 3600 Hz if the magnetic disk medium of the large-capacity FD 40 rotates at its prescribed rotation speed of 3600 rpm by the spindle motor 100.

Turning to FIG. 4, description will proceed to a control system according to an embodiment of this invention. The illustrated control system comprises a control device 60 as well as the switch unit 50 illustrated in FIG. 1. The control device 60 is for controlling drive of the spindle motor 100. The control device 60 comprises a logic circuit 61, a clock oscillator 62, and a spindle motor driver 63. Responsive to a detected signal from the switch unit 50, the logic circuit 61 selectively produces one of a low speed selection signal $S_L$ and a high speed selection signal $S_H$ in the manner which will later become clear. The clock oscillator 62 oscillates a clock signal CLK having a clock frequency of 1 MHz. Responsive either the low speed selection signal $S_L$ or the high speed selection signal $S_H$, the spindle motor driver 63 drives the spindle motor 100 in synchronism with the clock signal CLK on the basis of the FG signal.

The low speed selection signal $S_L$ is a signal indicative of making the magnetic disk medium of the inserted FD rotate at the low rotation speed of 300 rpm. The high speed selection signal $S_H$ is a signal indicative of making the magnetic disk medium of the inserted FD rotate at the high rotation speed of 3600 rpm.

The spindle motor driver 63 comprises a phase-locked loop (PLL) circuit 631 and a driving transistor 632. The PLL circuit 631 includes a frequency divider (not shown) for frequency dividing the clock signal CLK. Responsive to the low speed selection signal $S_L$, the frequency divider frequency divides the clock signal CLK having the clock frequency of 1 MHz into a divided signal signal having a divided frequency of 300 Hz. Likewise, responsive to the high speed selection signal $S_H$, the frequency divider frequency divides the clock signal having the clock frequency of 1 MHz into a divided signal having a divided frequency of 3600 Hz. The PLL circuit 631 detects a phase difference between the FG signal and the divided signal to produce a control signal indicative of the phase difference. On the basis of the control signal, the driving transistor 632 drives the spindle motor 100. That is, the spindle motor driver 63 drives the spindle motor 100 so that the frequency of the FG signal coincides with the divided frequency of the divided signal.

Figure 5:
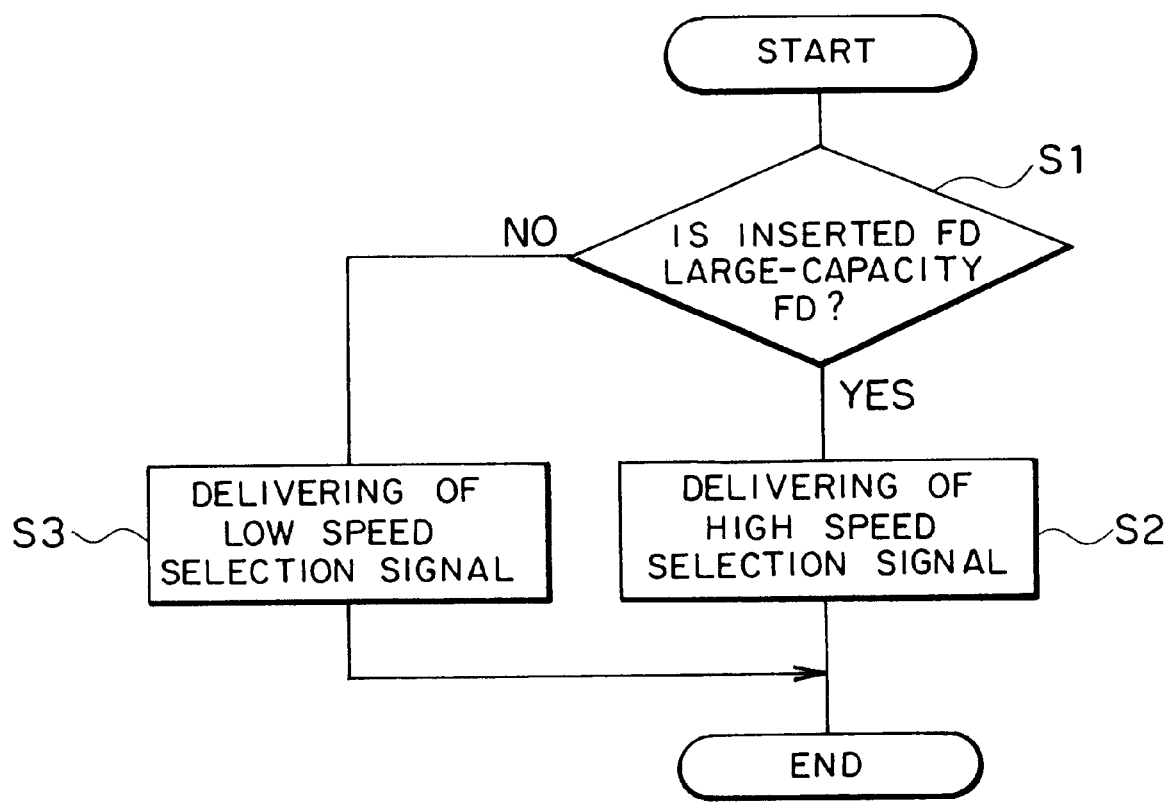
FIG. 5 is a flow chart for use in describing operation of the control system illustrated in FIG. 4.

Referring to FIG. 5 in addition to FIG. 4, the description will proceed to operation of the control system illustrated in FIG. 4.

It is assumed that the large-capacity FD 40 (FIG. 3) is inserted in the high-density/low-density compatible type FDD illustrated in FIG. 1. In this event, the switch circuit 50 detects that the inserted FD is the large-capacity FD 40 and then supplies the logic circuit 61 with the detected signal indicative of detection of the large-capacity FD 40. Responsive to the detected signal, the logic circuit 61 determines that the inserted FD is the large-capacity FD 40 (YES in a first step S1) and then delivers the high speed selection signal $S_H$ to the spindle motor driver 63 at a second step S2. Responsive to the high speed selection signal $S_H$, the spindle motor driver 63 drives the spindle motor 100 so as to rotate at the high rotation speed of 3600 rpm.

It is assumed that the small-capacity FD is inserted in the high-density/low-density compatible type FDD illustrated in FIG. 1. In this event, the switch circuit 50 detects that the inserted FD is the small-capacity FD and then supplies the logic circuit 61 with the detected signal indicative of detection of the small-capacity FD. Responsive to the detected signal, the logic circuit 61 determines that the inserted FD is the small-capacity FD (NO in the first step S1) and then delivers the low speed selection signal $S_L$ to the spindle motor driver 63 at a third step S3. Responsive to the low speed selection signal $S_L$, the spindle motor driver 63 drives the spindle motor 100 so as to rotate at the low rotation speed of 300 rpm.

As described above, the control system determines the type of the inserted FD and automatically rotates, on the basis of result of determination, the magnetic disk medium of the inserted FD at the rotation speed matched therewith by the spindle motor 100.

Figure 6:
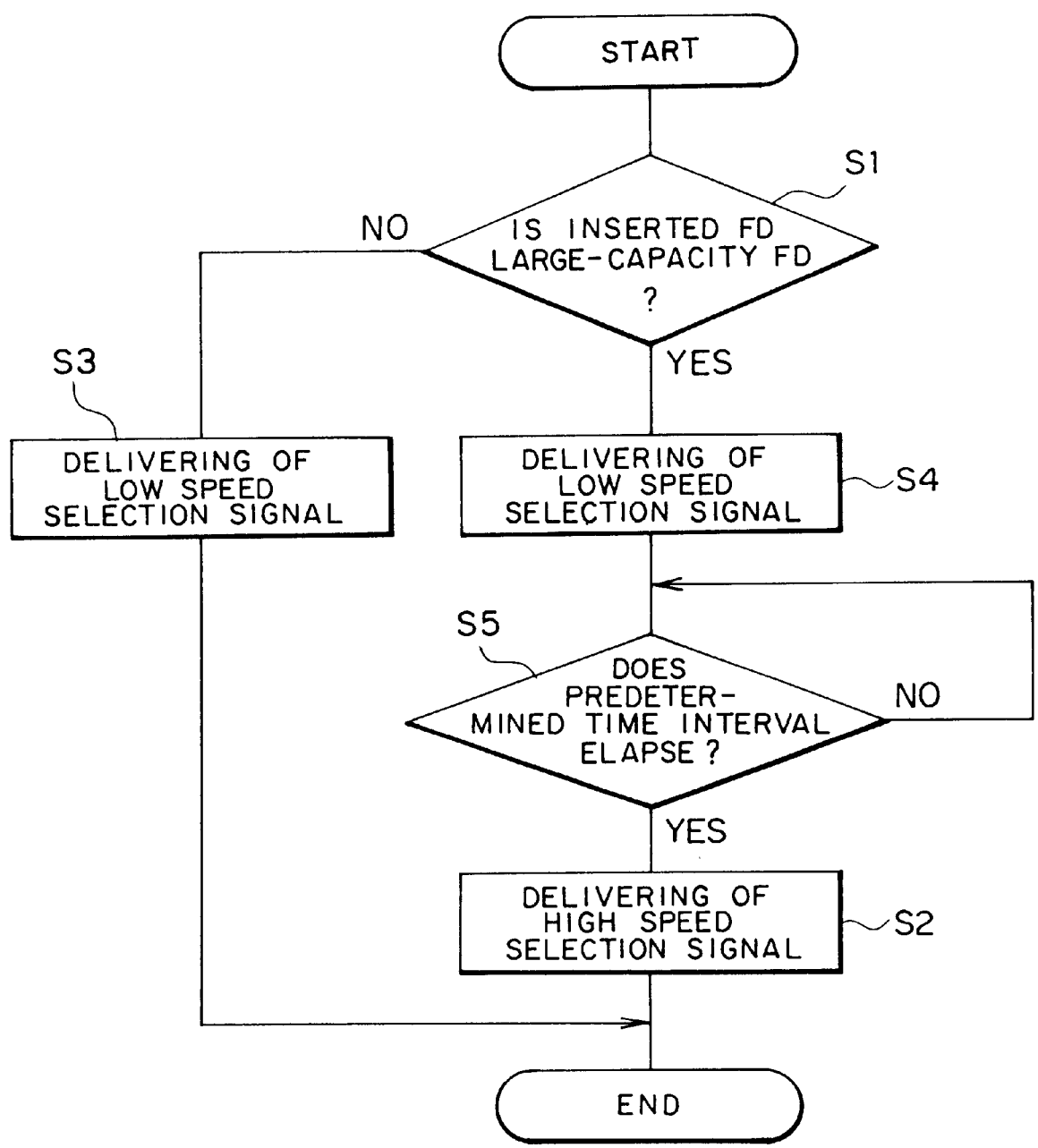
FIG. 6 is a flow chart for use in describing a starting method for the spindle motor and a disk chucking method for the high-density type flexible disk drive according to another embodiment of this invention.

Referring to FIG. 6 in addition to FIGS. 1 through 4, the description will proceed to a starting method of the spindle motor 100 and a disk chucking method for the high-density type FDD according to another embodiment of this invention. A flow chart illustrated in FIG. 6 is similar to that illustrated in FIG. 5 except that fourth and fifth steps S4 and S5 are added to the flow chart in FIG. 5 with the fourth and the fifth steps S4 and S5 inserted between the first step S1 and the second step S2.

Description will at first proceed to operation in a case where the large-capacity FD 40 (FIG. 3) is inserted into the high-density type FDD illustrated in FIG. 1 and the large-capacity FD 40 is driven. When the large-capacity FD 40 is inserted into the high-density type FDD, a disk holder (not shown) holding the large-capacity PD 40 descends and then the large-capacity FD 40 is loaded with a load downwards. As a result, the disk hub 43 of the large-capacity FD 40 is mechanically in contact with the disk holder table 12 with the spindle shaft 104 of the spindle motor 100 freely received in the disk center hole 43a bored in the disk hub 43 of the large-capacity FD 40 and then the magnetic disk medium 41 of the large-capacity FD 40 is put between the pair of the magnetic heads. At the same time, the switch circuit 50 detects that the inserted FD is the large-capacity FD 40 and then supplies the logic circuit 61 with the detected signal indicative of detection of the large-capacity FD 40.

Responsive to the detected signal, the logic circuit 61 determines that the inserted FD is the large-capacity FD 40 (YES in the first step SI) and then delivers the low speed selection signal $S_L$ to the spindle motor driver 63 at the fourth step S4. Responsive to the low speed selection signal $S_L$, the spindle motor driver 63 drives the spindle motor 100 so as to rotate at the low rotation speed of 300 rpm.

The fourth step S4 is followed by the fifth step S5 at which the logic circuit 61 determines whether or not a predetermined time interval elapses. Inasmuch as the disk holder table 12 rotates at the low rotation speed by the spindle motor 100 for the predetermined time interval, the chucking pin 108 of the spindle motor 100 is freely received in the chucking hole 43b bored in the disk hub 43 of the large-capacity FD 40. That is, chucking is made with respect to the disk hub 43 of the large-capacity FD 40. It is noted that the chucking pin 108 is freely received in the chucking hole 43b alone and then chucking is not positively carried out between the disk hub 43 and the disk holder table 12 at this time instant. This is because the large-capacity FD 40 is different from the small-capacity FD and does not have an arrangement such as a lifter for applying any load to the magnetic disk medium 41 in the case 42 as described above.

After the predetermined time interval elapses or the chucking is carried out (YES in the fifth step S5), the logic circuit 61 delivers the high speed selection signal $S_H$ to the PLL circuit 631 of the spindle motor driver 63 at the second step S2. Responsive to the high speed selection signal $S_H$, the spindle motor driver 63 drives the spindle motor 100 so as to rotate at the high rotation speed of 3600 rpm.

After the spindle motor 100 responds to the high speed selection signal $S_H$, the rotation speed of the spindle motor 100 changes from the low rotation speed of 300 rpm up to the high rotation speed of 3600 rpm by a predetermined abrupt acceleration (which reaches the high rotation speed of 3600 rpm within, for example, three seconds). In the process of the above-mentioned changing of the rotation speed, the disk holder table 12 rotates in a clockwise direction indicated by at an arrow e in FIG. 2A. As a result, the chucking pin 108 moves in the table driving oval hole 12a of the disk holder table 12 along the inclined portion 12a-1 thereof in the radial direction outwardly so as to make the chucking pin 108 engage with the corner portion 43b-1 of the chucking hole 43b in the disk hub 43. Accordingly, the chucking is positively carried out between the disk hub 43 and the disk holder table 12.

As described above, inasmuch as the spindle motor 100 rotates at the low rotation speed on rotation starting of the magnetic disk medium 41 of the large-capacity FD 40, the chucking is carried out during the low rotation speed. After the chucking is carried out, the spindle motor 100 rotates at the high rotation speed so as to rise up to the high rotation speed from the low rotation speed by the predetermined abrupt acceleration. Accordingly, it is possible to positively carry out the chucking on the rotation starting of the magnetic disk medium 41 of the large-capacity FD 40.

Description will proceed to operation in a case where the small-capacity FD is inserted into the high-density type FDD illustrated in FIG. 1 and the small-capacity FD is driven. In this event, the switch circuit 50 detects that the inserted FD is the small-capacity FD and then supplies the logic circuit 61 with the detected signal indicative of detection of the small-capacity FD. Responsive to the detected signal, the logic circuit 61 determines that the inserted FD is the small-capacity FD (NO in the first step S1) and then delivers the low speed selection signal $S_L$ to the PLL circuit 631 of the spindle motor driver 63 at the third step S3. Responsive to the low speed selection signal $S_L$, the spindle motor driver 63 drives the spindle motor 100 so as to rotate at the low rotation speed of 300 rpm. It is noted that the small-capacity FD has the lifter for apply the load to the magnetic disk medium thereof in the case as described above. As a result, the chucking is positively carried out although the rotation speed of the magnetic disk medium in the small-capacity FD is the low rotation speed of 300 rpm.

While this invention has thus far been described in conjunction with a few preferred embodiments thereof, it will now be readily possible for those skilled in the art to put this invention into various other manners. For example, switching of the rotation speed in the spindle motor 100 may be carried out by switching of clock frequencies of the clock oscillator 62 although the switching of the rotation speed in the spindle motor is carried out by switching of a dividing number in the PLL circuit 631 in the above-mentioned embodiments. In addition, the spindle motor driver 63 may comprise two PLL circuits, namely, a first PLL circuit for the low rotation speed and a second PLL circuit for the high rotation speed and may select one of the two PLL circuits by switching from one to another.

What is claimed is:

1. A method of starting rotation of a magnetic disk medium of a large-capacity flexible disk using a spindle motor in a high-density type flexible disk drive for carrying out data recording and reproducing to and from the magnetic disk medium, said magnetic disk medium being required to be rotated at a high rotation speed on recording and reproducing, and said large-capacity flexible disk having a disk hub for holding the magnetic disk medium, said method comprising:

a first step of initially rotating the spindle motor at a low rotation speed which is substantially lower than the high rotation speed; and a second step of rotating the spindle motor at the high rotation speed after chucking has been achieved with respect to the disk hub of the large-capacity flexible disk.

2. A method as claimed in claim 1, wherein the high rotation speed is a rotation speed which is at least ten times the low rotation speed.

3. A method as claimed in claim 2, wherein the high rotation speed is approximately 3600 rpm, and the low rotation speed is approximately 300 rpm.

4. A method as claimed in claim 1, wherein said second step comprises increasing the low rotation speed to the high rotation speed by means of a predetermined abrupt acceleration.

5. A disk chucking method for use in a high-density type flexible disk drive for carrying out data recording and reproducing to and from a magnetic disk medium of a large-capacity flexible disk which is required to be rotated at a high rotation speed on recording and reproducing, said large-capacity flexible disk having a reduced load with respect to the magnetic disk medium on rotation thereof, said large-capacity flexible disk comprising a disk hub for holding the magnetic disk medium, said disk hub having a chucking hole with a corner portion in an outward radial direction, said high-density type flexible disk drive including a spindle motor for rotating the disk hub, said spindle motor comprising a disk holder table for holding the disk hub and a chucking pin which can be freely received in the chucking hole, and said disk holder table having a table driving oval hole with an inclined portion, said method comprising the steps of:

initially rotating the spindle motor at a low rotation speed which is substantially lower than the high rotation speed; and increasing the low rotation speed of the spindle motor to the high rotation speed from by means of a predetermined abrupt acceleration after chucking has been achieved with respect to the disk hub of the large-capacity flexible disk, thereby causing the chucking pin to move in the table driving oval hole of the disk holder table along the inclined portion thereof in the outward radial direction so as to engage with the corner portion of the chucking hole, whereby the chucking is positively carried out between the disk hub and the disk holder table.

6. A method as claimed in claim 5, wherein the high rotation speed is a rotation speed which is at least ten times the low rotation speed.

7. A method as claimed in claim 6, wherein the high rotation speed is approximately 3600 rpm, and the low rotation speed is approximately 300 rpm.

* * * * *